United States Patent [19]

Trecker et al.

[11] Patent Number: 5,378,479
[45] Date of Patent: Jan. 3, 1995

[54] METHOD FOR MANUFACTURE OF SKIM MILK CHEESE

[75] Inventors: Gary W. Trecker, Lake Zurich; James W. Moran, Antioch; Walter Ley, Prospect Heights, all of Ill.

[73] Assignee: Kraft General Foods, Inc., Northfield, Ill.

[21] Appl. No.: 171,191

[22] Filed: Dec. 21, 1993

Related U.S. Application Data

[63] Continuation of Ser. No. 951,230, Sep. 25, 1992, abandoned.

[51] Int. Cl.6 ............................................. A23C 19/072
[52] U.S. Cl. ........................................ 426/42; 426/36; 426/38
[58] Field of Search ........................ 426/34, 36, 38, 42, 426/43

[56] References Cited

U.S. PATENT DOCUMENTS

| | | |
|---|---|---|
| 706,104 | 8/1902 | Piggott . |
| 1,418,242 | 5/1922 | Fieldman . |
| 2,701,204 | 2/1955 | Strezynski ............................ 426/36 |
| 2,871,126 | 1/1959 | Smith et al. ........................... 426/36 |
| 3,017,274 | 1/1962 | Dahlstrom ............................ 426/36 |
| 3,100,712 | 8/1963 | Meeker et al. ........................ 99/178 |
| 3,156,568 | 11/1964 | Hargrove et al. .................... 426/36 |
| 3,175,915 | 3/1965 | Murphy ................................ 99/116 |
| 3,355,805 | 12/1967 | Krueger et al. ....................... 31/46 |
| 3,404,009 | 10/1968 | Lambert et al. ..................... 99/116 |
| 3,523,367 | 8/1970 | Czulak ................................... 31/89 |
| 3,891,783 | 6/1975 | Robertson et.al. ................. 426/478 |
| 3,969,995 | 7/1976 | Krueger et al. ..................... 99/458 |
| 4,049,838 | 9/1977 | Krueger et al. ..................... 426/478 |
| 4,058,630 | 11/1977 | Corbic nee Busnel ............... 426/36 |
| 4,234,615 | 11/1980 | Krueger ............................... 426/478 |
| 4,476,143 | 10/1984 | Czulak et al. ......................... 426/40 |
| 5,151,358 | 9/1992 | Heinsohn et al. ..................... 426/36 |

OTHER PUBLICATIONS

Potter, N. N., Food Science, third edition, 1978, AVI Publishing Co., Westport Conn., pp. 401–419.
Kosikowski, F., "Cheese and Fermented Milk Foods", pp. 201–202, Dept. Dairy & Food Science, Cornell University, published by author, 1966.

*Primary Examiner*—Carolyn Paden
*Attorney, Agent, or Firm*—Fitch, Even, Tabin & Flannery

[57] ABSTRACT

The present invention is directed to a method for making a high moisture, low-fat cheddar type cheese product from skim milk. The skim milk cheddar cheese product has from about 54% to about 58% moisture and less than 1% fat. The process parameters of the method are established to provide a skim milk cheddar cheese bulk product having uniform moisture and pH. In the method of the invention, skim milk is fermented, coagulated, cut into curd and whey, cooked, drained, washed and salted at particular times and pH's. The curd particles, having about 60% moisture, are then placed into 55 gallon drums and are pressed in cheddar cheese type pressing apparatus to remove moisture and provide a curd with about 60% moisture. A foraminous plate is then placed over the drum opening. The drum is inverted and the whey which is expelled from the curd by syneresis is drained for a period of from about 10 to about 24 hours until the curd has attained a pH of from about 4.9 to about 5.4.

4 Claims, 3 Drawing Sheets

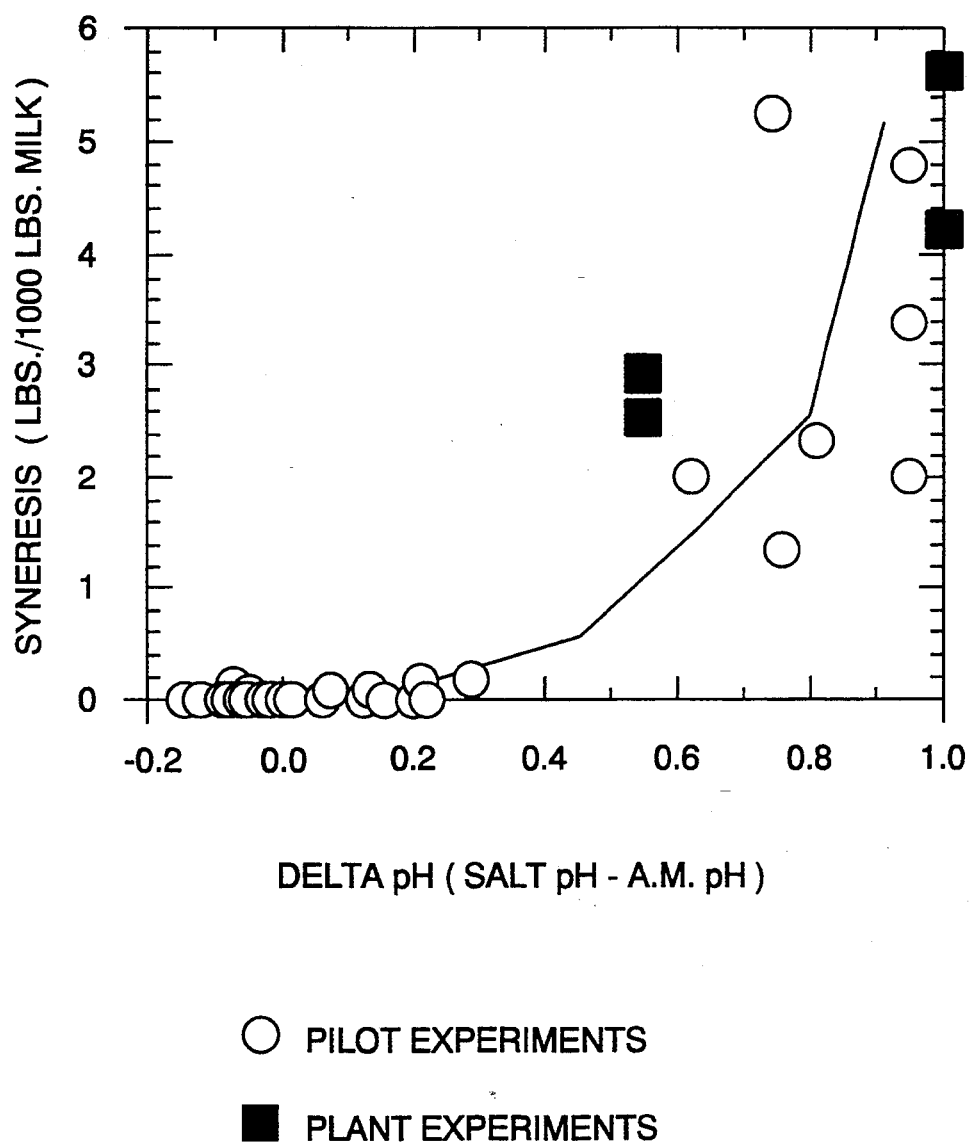

METHOD FOR MANUFACTURE OF SKIM MILK CHEESE

This application is a continuation of application Ser. No. 951,230 filed Sep. 25, 1992 now abandoned.

FIELD OF THE INVENTION

The present invention relates generally to a method for making a high moisture natural cheese from skim milk. More particularly, the present invention is directed to producing skim milk cheese for manufacturing which has uniform moisture and which has a controlled degree of proteolysis.

The term "skim milk cheese for manufacturing" is understood in the industry to mean a cheese made from skim milk which is intended to be used as a component in processed cheese products in combination with fat containing cheeses such as cheddar cheese and swiss cheese. The skim milk cheese of the present invention is intended to be used in a processed cheese process to produce a non-fat or low-fat cheese.

BACKGROUND OF THE INVENTION

It is known, as reported in a book by Kosikowski, "Cheese and Fermented Milk Foods", 1966, to manufacture skim milk cheese by a cheddar cheese process. In this diet and calorie-conscious era, skim milk cheddar cheese would appear to be highly desirable. However, as reported in the Kosikowski reference, skim milk cheese made by a cheddar cheese process is without much cheese flavor and the body texture of skim milk cheddar cheese is very hard. Rapid drying out of the skim milk cheese during cooking in the vat is a characteristic feature, despite the use of low cooking temperatures of 88° F.

In one method for the manufacture of cheddar cheese, a batch of milk is placed in a cheese vat and is inoculated with a lactic acid starter. After the desired degree of lactic acid development has been attained, rennet is added to set or coagulate the milk. When the resulting curd has attained the proper degree of firmness, the curd is cut into cubes with curd knives. The curd is then agitated in the whey and heated to a temperature of about 100° F. to about 105° F., the heating of the curd to the desired temperature, preferably takes place over a period of about 30 minutes. The curd is held at this temperature and agitation of the curd is continued until the acidity of the whey reaches about 0.13 to 0.16, expressed as percent lactic acid or its equivalent, at which time the heating is terminated and the whey is drained from the cheese vat. Usually, the temperature is maintained for about one hour. The mass of curd is then formed or "ditched" to facilitate whey drainage.

The curd is then allowed to knit and drain after which it is cut into blocks or slabs which are turned on the bottom of the vat. After about one hour, the slabs are stacked, cut and restacked by hand during which time the acidity of the curd increases and further amounts of whey are expelled from the curd. The cutting, turning and stacking of the cheese curd in the cheese vat is known as "cheddaring". Cheddaring is usually continued for a period of about two hours until the desired knit and smoothness of curd is achieved. The cheese curd is then milled into small pieces which may be washed, after which the curd is salted with an amount of salt to provide a total salt content of from about 1.65 to 1.9 percent by weight of the curd. The salted curd is then placed in hoops and pressed overnight. The pressed curd is then wrapped and cured until the desired flavor characteristics are attained.

Cheddar cheese has a fat content of at least about 50% on a dry basis and has not more than 39% moisture. After the moisture of the curd has been reduced to less than about 39%, the cheddar curd containing 50% fat, dry basis, does not undergo any further syneresis or expulsion of whey.

Washed curd (or soaked curd) cheese is a semisoft to slightly firm cheese that is made in the same way as cheddar except that the milled curd is washed with water before it is salted. "Soaked curd" usually indicates a longer washing period that "washed curd".

The curd is matted and milled as in making cheddar. Then water is added, and the curd is stirred in the water for several minutes, or as long as half an hour, as it cools. Part of the whey is extracted, and water is absorbed by the curd during this process. Then the curd is drained, salted and pressed as in the cheddar process.

Washing the curd increases the moisture content of the cheese, reduces the lactose content and final acidity, decreases body firmness and increases openness of texture. Washed curd cheese does not keep as well as cheddar. Usually it is cured for only 1 or 2 months. If it is made from raw milk it must be cured for at least 60 days unless it is to be used in manufacturing.

The final analysis of washed curd cheese is: moisture 40% (not more than 42%), fat in the solids, not less than 50%, and salt, 1.4% to 1.8%.

Many improvements have been directed in the cheddar cheese manufacturing operation to reduce the time required for draining the whey from the curd to attain the proper level of moisture. U.S. Pat. Nos. 3,969,995, 4,049,838 and 4,234,615, all to Krueger, et al. are directed to the use of a drainer blade which is inserted into a mass of cheddar curd. The drainer blade is V-shaped and has a number of holes for drainage of whey. As reported in the Krueger, et al. patents, the drainage time can be reduced to as little as 15 minutes after the drainer blades are inserted into the mass of curd and pressure is applied. The '615 Krueger patent reports uniform moisture attained in the curd block after pressing times of about 15 minutes to attain moisture contents in the range of about 37% to 42%. No further draining is required after the pressing step utilizing the drainer blades since no further syneresis of whey occurs in the cheddar curd.

In the manufacture of skim milk cheddar cheese, however, syneresis of whey takes place for a substantial period after the curd has been pressed utilizing drainer blades or other means to remove moisture. The syneresis takes place as the pH of the skim milk cheddar curd continues to drop as shown in FIG. 3. If the skim milk cheddar curd is placed into fiber drums lined with a plastic bag, the whey which is expelled from the curd collects inside the bag and sometimes causes the bag to break. Since the fiber drums are not water tight, the whey exits from the fiber drums onto the storage room floor. When steel drums are used to replace the fiber drums, a skim milk cheddar curd is produced which has substantial variations in moisture from the center to the edge and from the top to the bottom. Also, the synersed whey is held in contact with the curd, which causes excessive proteolysis of α-casein. Skim milk cheese with too little proteolysis will result in uncooked curd when the skim milk cheese is processed into a low fat or no fat processed cheese product. Excessive proteolysis results in a soft and bitter processed cheese product.

Accordingly, it is a principal object of the present invention to produce a skim milk cheddar cheese which has a uniform level of moisture throughout a large curd block. It is another object of the present invention to provide a skim milk cheddar cheese which has desirable organoleptic properties.

DESCRIPTION OF THE DRAWINGS

FIG. 3 is a plot of syneresed whey versus pH drop from the time of salting until the following morning.

SUMMARY OF THE INVENTION

Figure 1:
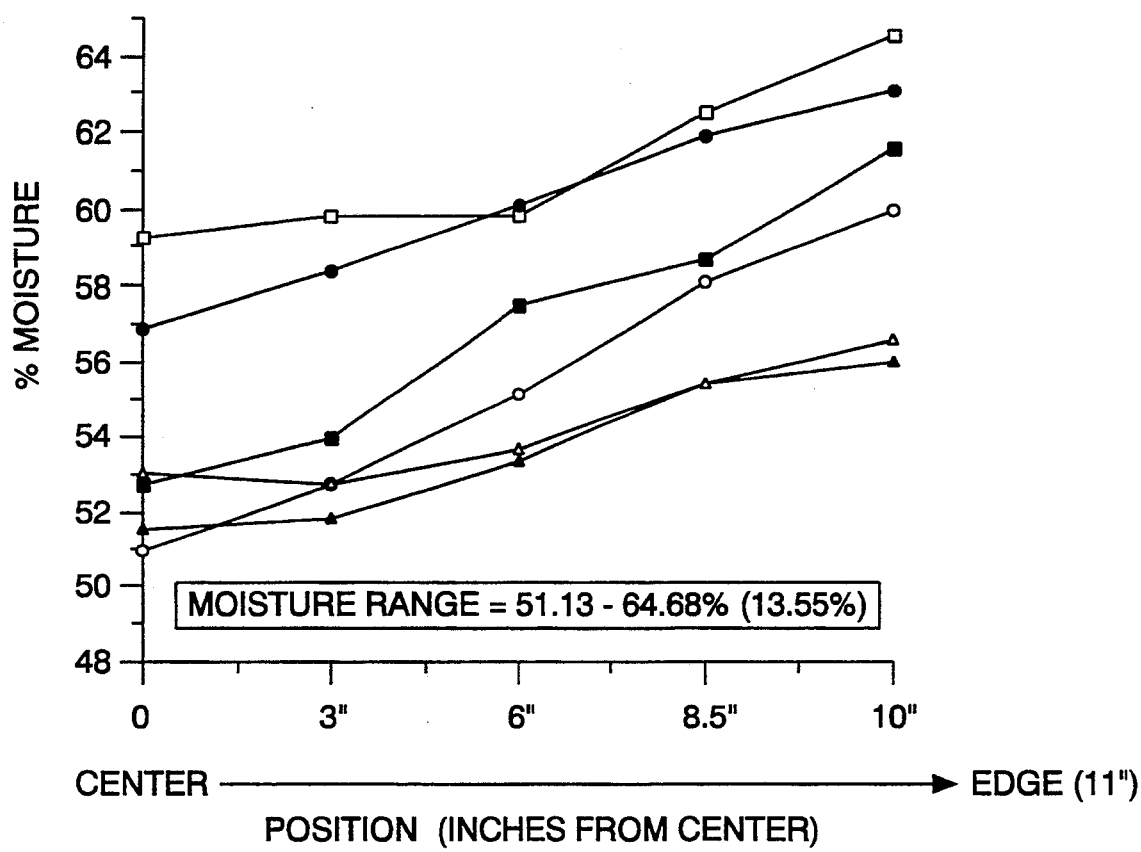
FIG. 1 is a plot of moisture versus position of various layers in a 55 gallon drum for skim milk cheddar curd after a storage period of 28 days.

The present invention is directed to a method for making a high moisture, low-fat cheddar type cheese product from skim milk. The skim milk cheddar cheese product has from about 54% to about 58% moisture and less than 1% fat. The process parameters of the method are established to provide a skim milk cheddar cheese bulk product having uniform moisture and pH. In the method of the invention, skim milk is fermented, coagulated, cut into curd and whey, cooked, drained, washed and salted at particular times and pH's. The curd particles, having about 60% moisture, are then placed into 55 gallon drums and are pressed in cheddar cheese type pressing apparatus to remove moisture and provide a curd with about 60% moisture. A foraminous plate is then placed over the drum opening. The drum is inverted and the whey which is expelled from the curd by syneresis is drained for a period of from about 10 to about 24 hours until the curd has attained a pH of from about 4.9 to about 5.4.

DETAILED DESCRIPTION OF THE INVENTION

Generally, in accordance with the invention, cow's milk is processed to provide a skim milk having as low a fat content as possible. In general, this fat content will be less than about 0.2%. After skim milk cheddar cheese is made from the skim milk, the fat content of the cheese is increased due to removal of whey, but remains under about 0.5%. All percentages used herein are by weight unless otherwise indicated. The skim milk is pasteurized at suitable time, temperature conditions, such as 163° F. for a 16 to 18 second hold time. After pasteurization, the skim milk is delivered to vats at a temperature of from about 85° F. to about 92° F.

Sufficient lactic starter culture, such as S. lactis, is added to the milk to provide the desired pH at the time of transferring the resulting curd to the drain table. In general, the pH at this time should be in the range of from about 5.9 to about 6.1. Fermenting is continued for a period of from about 30 to about 50 minutes while the skim milk is maintained at a temperature in the range of from about 85° F. to about 92° F. The temperature and time during the ripening period is adjusted to attain the desired product pH at the time of pumping the curd to the drain table.

After the curd has ripened for the desired period of time, a sufficient amount of a milk coagulating enzyme is added to the milk to provide a firm set within about 30 minutes after the addition of the enzyme. The milk coagulating enzyme is added at a minimum level equivalent to the addition of 6 fluid ounces of single strength rennet per 100 pounds of protein in the vat to a maximum of about 8 ounces. If a protein analysis is not available, the minimum is 2 fluid ounces of single strength rennet per 1000 pounds of milk in the vat up to about 4 ounces. The single strength rennet is diluted with water at a ratio of water to rennet of at least 20:1 by volume. The dilution is made immediately prior to use. It is important that the rennet be added to the milk within no more than 5 minutes after dilution. The dilution water must contain no chlorine. The vat agitators are stopped about 2 minutes after addition of the milk coagulating enzyme. The milk sets and provides a coagulum within about 20 to about 40 minutes after addition of the milk coagulating enzyme.

In this connection, the casein micelles of skim milk are very stable at the normal pH of about 6.6. The casein micelles have a net negative charge on their surface; repelling each other, thus, staying dispersed in the milk. If the pH is reduced via acid coagulation to the isoelectric point of about 4.6, calcium phosphate moves out of the casein micelle and the net negative charge on the casein micelle's surface becomes zero. Without any charge to hold the casein in suspension, it ultimately precipitates as a curd. Acid coagulation, however, provides a grainy, highly acidic coagulum which is not suitable for most cheese making operations. Accordingly, it is the usual practice to produce a coagulum from milk through the use of enzymes, such as rennet. Rennet coagulation of milk is fundamentally different from acid coagulation of milk. Rennet reacts with the surface casein encompassing each micelle. This stabilizing fraction of the micelle is known as kappa casein. It provides a protective water soluble coating around the alpha casein and beta casein (the insoluble milk caseins which constitute the internal portion of the micelle). Chymosin, the active enzyme in rennet, cleaves the kappa casein molecule converting it to para-kappa casein and glycomacropeptide. The para-K casein remains with the original portion of the micelle while the glycomacropeptide is lost from the casein into the whey. As the enzymatic phase of coagulation proceeds (at a pH of about 6.4 to 6.5), a secondary, non-enzymatic phase begins to occur as the free ionic calcium present in the milk reacts to cause the casein micelles to form a network of chains. The resulting coagulum is typically very smooth.

Rennet, however, is a very proteolytic enzyme. Upon extended storage during the curing period substantial proteolysis of alpha casein, the largest fraction of casein, occurs. Generally, this is not detrimental to normal, full fat cheese making procedures, since such proteolysis produces desirable peptides associated with the particular cheese. Undesirable peptides linked to bitter off flavors are believed to be masked by the milk fat, acting as a solvent.

In the process of the present invention for producing a skim milk cheese for manufacturing, it has been determined that it is important to control the proteolysis of alpha casein. Alpha casein is the most prevalent fraction of the casein micelle, i.e., about 50%. If the proteolysis of alpha casein is too low, the resulting processed cheese made from the skim milk cheese will be excessively firm in texture with uncooked curd specks. If proteolysis is too high, the processed cheese will be soft-textured with bitter flavor.

In the process of the present invention, the proteolysis is controlled so that the degraded amount of alpha casein (as determined by polyacrylamide gel electrophoresis), is no less than about 47.5% and no more than about 72.5% of the original alpha casein level of the cheese at the beginning of the cure. For example, proteolysis for a zero-time skim cheese with 40% alpha casein would be controlled to yield a cheese suitable for manufacturing having no less than about 19% alpha casein and nor more than about 29% alpha casein. Proteolysis of $\alpha$-casein can be controlled through the selection of a coagulating enzyme, the amount of coagulating enzyme used and the duration and temperature of curing. The coagulating enzyme should be equivalent to calf rennet having a chymosin level of at least 95%. The calf rennet or equivalent should be added to the skim milk at a level of from about 6 fluid ounces to about 8 fluid ounces of single strength rennet per 100 pounds of skim milk protein.

The coagulum is then cut with conventional curd knives to provide curd particle sizes of from about $\frac{1}{4}$ inch to about $\frac{1}{2}$ inch.

The curd particles are agitated in the whey as the curd and whey is heated to a temperature in the range of from about 90° F. to about 104° F. within a period of from about 15 to about 35 minutes. The temperature and time to which the curd is heated can be adjusted to attain the desired product pH at the time of pumpover of the curd and whey to the drain table. As previously indicated, this pH is in the range of from about 5.9 to about 6.1. The curd and whey are stirred in the vat at the cook temperature for a sufficient time to attain the desired pH. The cooking time may be shortened and/or the stirring time increased to attain the desired pH target. Cook time should be no less than 15 minutes at the cooking temperature of 90° F. to 104° F.

When the curd has reached the desired pH range of between about 5.9 and about 6.1, the curd and whey are pumped over to the drain table without any predraw of whey from the vat. Predrawing of whey results in the curd becoming tightly matted in the bottom of the vat. The pumpover begins usually at a time of from about 1.5 to about 2 hours from the time of setting the curd into a coagulum. As discussed hereinabove, the time at pumpover may be adjusted to attain the desired pH.

The free whey should be removed from the curd on the drain table in a period of from about 30 to about 45 minutes from the start of the draw down. The drain table agitator speed is adjusted as required to minimize lumping of the curd. As the whey is drawn down from the curd on the drain table, the curd becomes packed. The pH of the curd at the time of packing is in the range of from about 5.55 to about 5.90 and the moisture is in the range of from about 58% to about 62%.

The curd is then washed to remove residual whey and to cause a pickup in the moisture of the curd of from about 2% to about 6%. All percentages used herein are by weight unless otherwise indicated. The curd is washed by submerging the curd in wash water or by spraying the curd with a fine mist of water while stirring the curd. The time at the beginning of the wash period is from about 30 to about 60 minutes from the start of pumpover of the curd to the drain table. This time may be adjusted to attain the final desired finished product pH and the pH at time of salting. The pH at the time of salting should be from about 5.5 to about 5.85. The curd is washed with from about 4 to about 10 gallons of water, at a temperature of from about 34° F. to about 68° F., per 1000 pounds of milk in the vat. The wash water may be sprayed on or the curd may be submerged for a dwell time of up to about 10 minutes. The wash water parameters are adjusted to attain the finished product moisture and pH ranges and to attain a temperature of curd after being packed into containers of from about 70° F. to about 75° F.

The curd should not be salted until the wash water is well drained. The moisture of the curd after draining the wash water is from about 60% to about 68%. The time at which salting begins is approximately 20 minutes from the start of wash water draining. This time may be adjusted to allow for complete draining and to attain the finished product pH. The pH at salting is from about 5.5 to about 5.85. Generally, from about 2 to about 2.7 pounds of salt are added per 100 pounds of protein in the vat. If protein analysis is not available, salt is added at a level of from about 0.7 to about 1 pound of salt per 1000 pounds of milk in the vat. The salt may be manually added to the curd in 4 equal applications.

The curd is filled into 55 gallon drums approximately 5 minutes after the final salt application. The drums are then processed by a suitable cheddar cheese processing apparatus to drain additional whey from the curd. One suitable method is described in U.S. Pat. No. 4,234,615 to Krueger. This method utilizes drainer blades after tilting the drums by a slight angle of 5 to 10 degrees, and pressure for a period of about 15 minutes followed by vacuum chamber treatment at about 28 inches of vacuum, for a period of about one hour.

The 55 gallon drum contains about 550 pounds of skim milk curd after Dressing. The drum opening is then closed with a perforated stainless steel plate. The perforated plate is flat on one side and is built up on the other side by welding a 2 inch lip around the perimeter. The perforated plate is placed flat side down over the cheese so that is spaced 2 inches from the top of the drum. The drum is then covered with a lid provided with a drain hole. The drum of skim milk curd is placed in a curing room having a temperature of from about 33° F. to 40° F. The drum is inverted and held in the inverted position for a period of time of from about 10 to about 20 hours with the drain hole open. The cheese becomes pressed under its own weight with gravity causing the whey which is provided by syneresis of the curd to drain from the curd over the period of time that the drum is inverted. The moisture content of the skim milk cheese after this draining step is from about 54% to about 58%. The relationship of change of pH and syneresis of whey is shown in FIG. 3. In general, from about 4 to about 50 pounds of whey is removed from the skim milk cheese during this draining period.

The drums are held in a cold room maintained at a temperature of from about 33° F. to about 45° F. for a period of from about 21 days to about 70 days to cure the high moisture skim milk cheese. The center temperature of the skim milk curd mass drops to 40° F. in about 4 to about 7 days. The skim milk cheese after curing has a hard rubbery texture and bland flavor which is suitable for manufacture of processed cheese with the addition of suitable flavoring materials.

Figure 2:
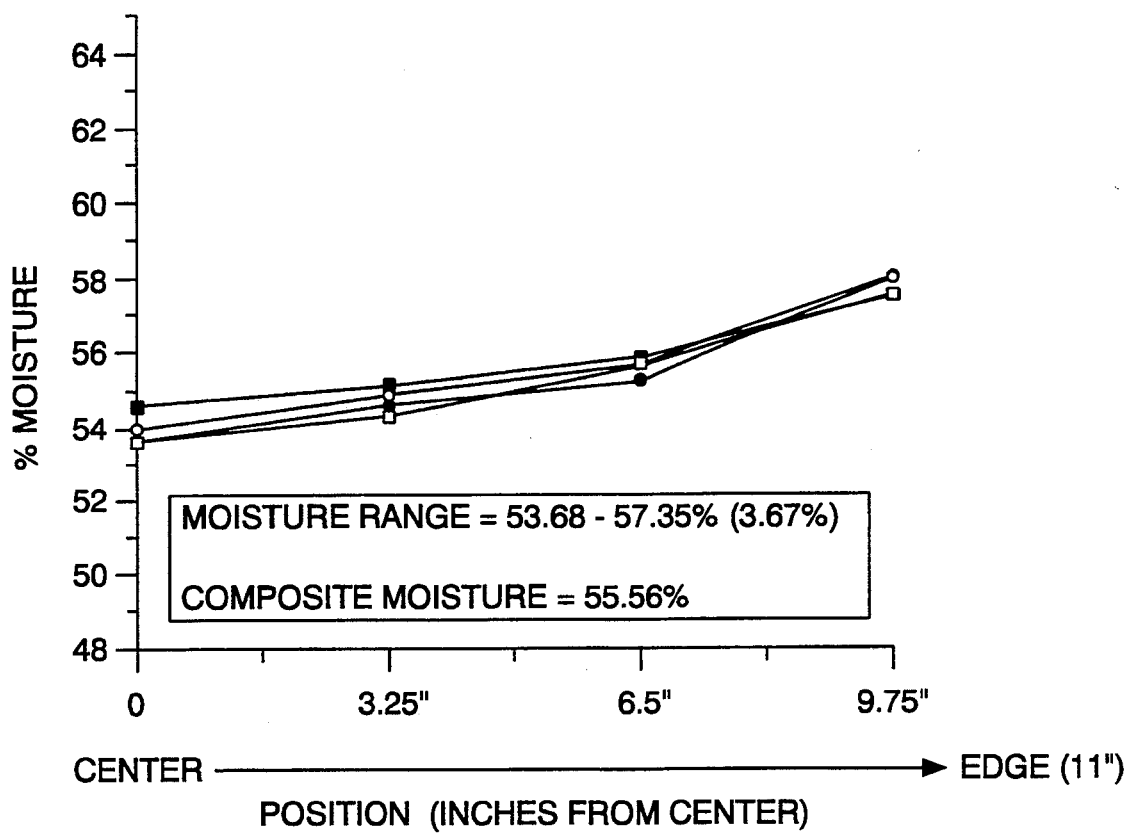
FIG. 2 is a plot of moisture versus position of various layers for a mass of curd stored in a 55 gallon drum in accordance with the invention for a period of 28 days.

As can be seen by comparing FIG. 1, which is stored without the use of a perforated plate, and FIG. 2 where the cheese curd is stored in an inverted position with the perforated plate, the uniformity of moisture is substantially improved.

The method of the present invention provides a high moisture skim milk cheese product. After curing for a period of from about 3 to about 9 weeks, the skim milk cheese product is utilized for the manufacture of low-fat and non-fat process cheese. The cheese texture after curing for the indicated period, is firmer than that of a cheddar cheese but is not as firm as that of a parmesan cheese. The method steps of the present invention to provide a skim milk, high moisture cheese are critical at each stage of the cheese making operation and adherence to the guidelines set forth must be maintained to provide the product with desired moisture and pH. The body of the finished product is susceptible to slight variations in the parameters of the method. The method steps of the present invention are at times antithetical to conventional cheese making practice and constitute a unique way to produce a new product, i.e., high moisture, skim milk cheese for manufacture with high protein content.

What is claimed is:

1. A method for making a high moisture, natural skim milk cheese for manufacturing having a moisture content of less than about 60% and a fat content of less than about 1% comprising:
   (a) providing curd particles by a process wherein skim milk is fermented with a dairy starter culture, formed into a coagulum by addition of a milk coagulating enzyme, said coagulum is cut to provide curd particles in whey, said curd particles are stirred at an elevated temperature to develop acidity in the curd and the whey is drained from the curd particles to provide said curd particles;
   (b) washing said curd particles as said curd particles are being stirred while said curd particles are at a pH of from about 5.30 to about 6.10 with sufficient water and for a sufficient time to provide a moisture in said curd of from about 60% to about 68%,
   (c) salting said curd after draining said wash water when the pH of said curd is from about 5.20 to about 6.0;
   (d) loading said curd into containers;
   (e) pressing said curd in cheddar cheese type processing apparatus four a period of from about 10 minutes to about 30 minutes to remove additional whey;
   (f) affixing a foraminous plate to said container opening;
   (g) inverting said container and draining syneresed whey from said curd for a period of from about 10 to about 20 hours until said curd has attained a pH of from about 4.90 to about 5.35 and a moisture content of from about 54% to about 58%; and
   (h) curing said curd to provide a skim milk cheese under conditions whereby the proteolysis of $\alpha$-casein is controlled so that the degraded amount of alpha casein is no less than about 47.5% and no more than about 72.5% of the original alpha casein level of the cheese at the beginning of the cure being controlled through the selection of said milk coagulating enzyme, the amount of said milk coagulating enzyme and the duration and temperature of curing, wherein said milk coagulating enzyme is added to said fermented skim milk at a level of from about 2 fluid ounces to about 4 fluid ounces per 1000 lb. of milk of single strength rennet equivalent to calf rennet having a chymosin level of at least 95% and the temperature of curing is about 33° F. to about 48° F.

2. A method in accordance with claim 1 wherein said skim milk is fermented at a temperature of from about 85° F. to about 100° F.

3. A method in accordance with claim 1 wherein said curd is stirred in said whey at an elevated temperature of from about 90° F. to about 126° F. for a period of time sufficient to develop a pH of from about 5.6 to about 6.10.

4. A method in accordance with claim 1 wherein said milk coagulating enzyme is added to said fermented skim milk at a level of from about 26 fluid ounces to about 4 fluid ounces per 1000 lb. of milk of single strength rennet equivalent to calf rennet having a chymosin level of at least 95% and the temperature of curing is about 33° F. to about 48° F.

* * * * *